O. BARTA.
STERILIZER FOR INSTRUMENTS AND DRESSINGS.
APPLICATION FILED MAR. 26, 1920.

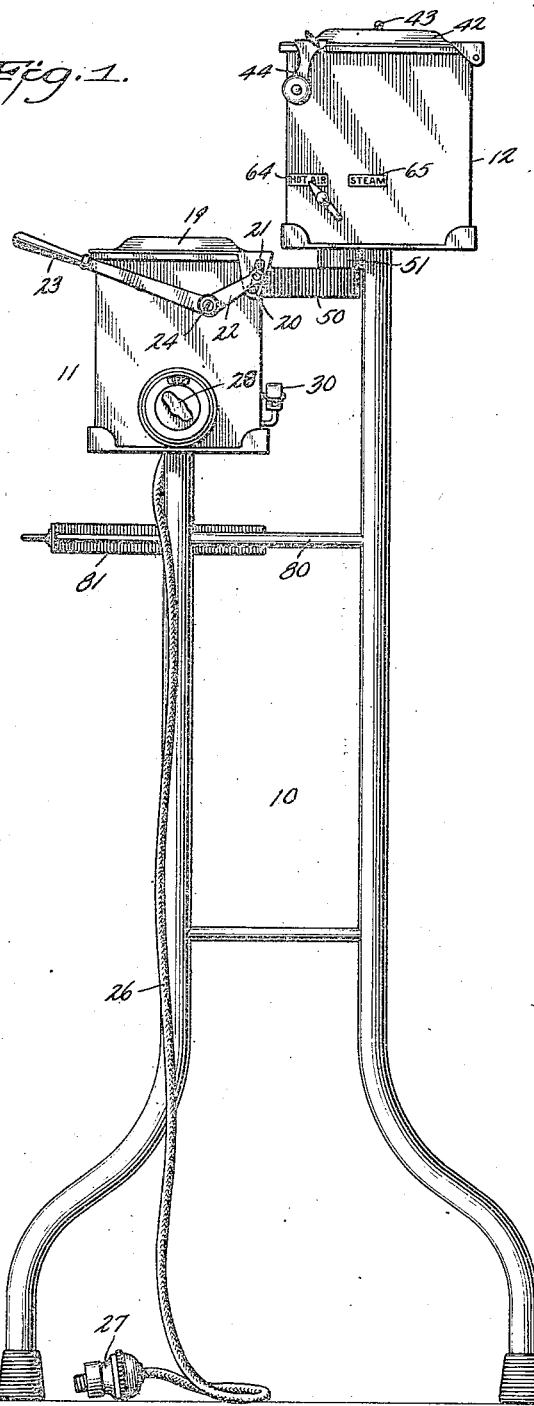

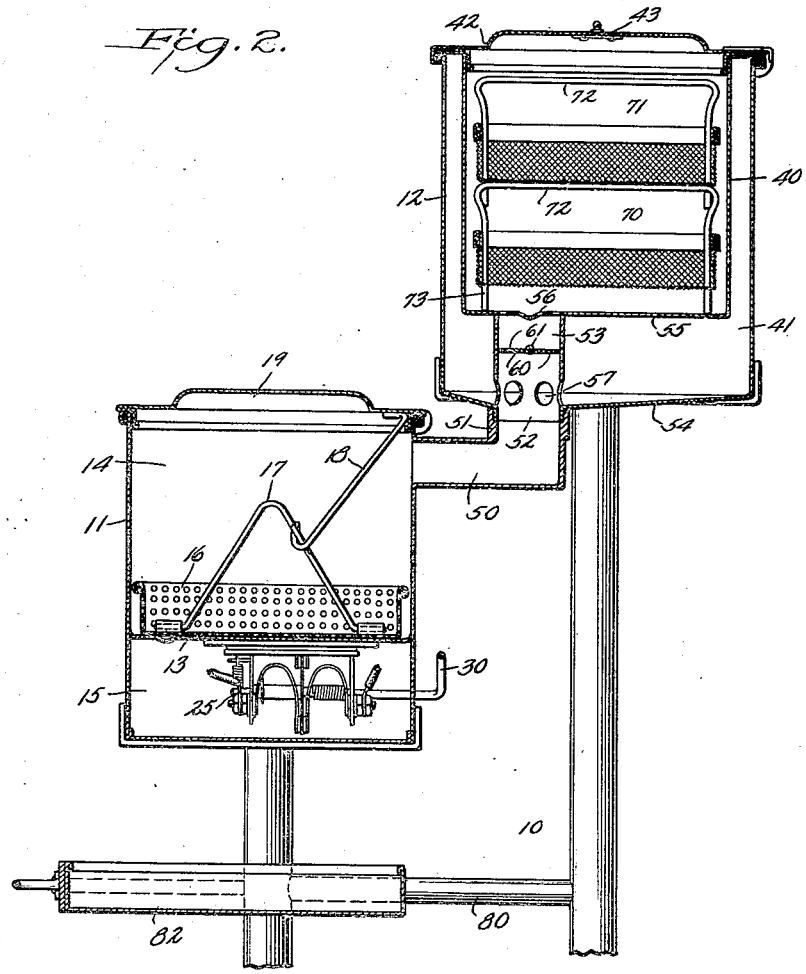
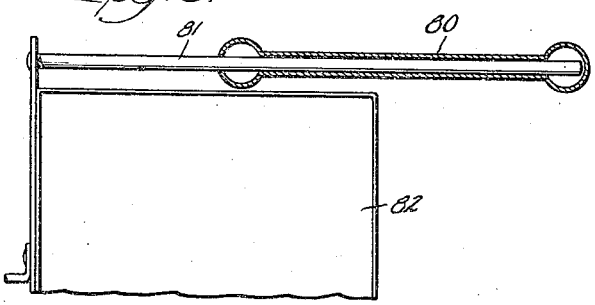

1,421,893.

Patented July 4, 1922.

WITNESSES

INVENTOR
OTTO BARTA,
BY
ATTORNEYS

UNITED STATES PATENT OFFICE.

OTTO BARTA, OF NEW YORK, N. Y.

STERILIZER FOR INSTRUMENTS AND DRESSINGS.

1,421,893.　　　Specification of Letters Patent.　　Patented July 4, 1922.

Application filed March 26, 1920. Serial No. 369,004.

*To all whom it may concern:*

Be it known that I, OTTO BARTA, a citizen of the United States, and a resident of the city of New York, borough of Manhattan, in the county and State of New York, have invented a new and Improved Sterilizer for Instruments and Dressings, of which the following is a full, clear, and exact description.

The object of the invention is to provide a new and improved sterilizer more especially designed for sterilizing surgical, dental and other instruments and dressings, and arranged to insure a thorough sterilizing of the instruments and dressings, to properly dry the dressings, and to allow of readily placing the instruments and the dressings in the apparatus or to remove the same therefrom for use after being sterilized.

Another object is to sterilize the instruments at the same time with the dressings but separate therefrom, and to utilize the same source of heat for sterilizing both the instruments and the dressings.

With these and other objects in view, the invention consists of certain novel features of construction as hereinafter shown and described and then specifically pointed out in the claims.

A practical embodiment of the invention is represented in the accompanying drawings forming a part of this specification, in which similar characters of reference indicate corresponding parts in all the views.

Figure 1 is a side elevation of the improved sterilizer;

Figure 2 is an enlarged sectional side elevation of the same;

Figure 3 is a plan view of the tray for receiving the sterilized instruments, part being shown in section;

Figure 4:
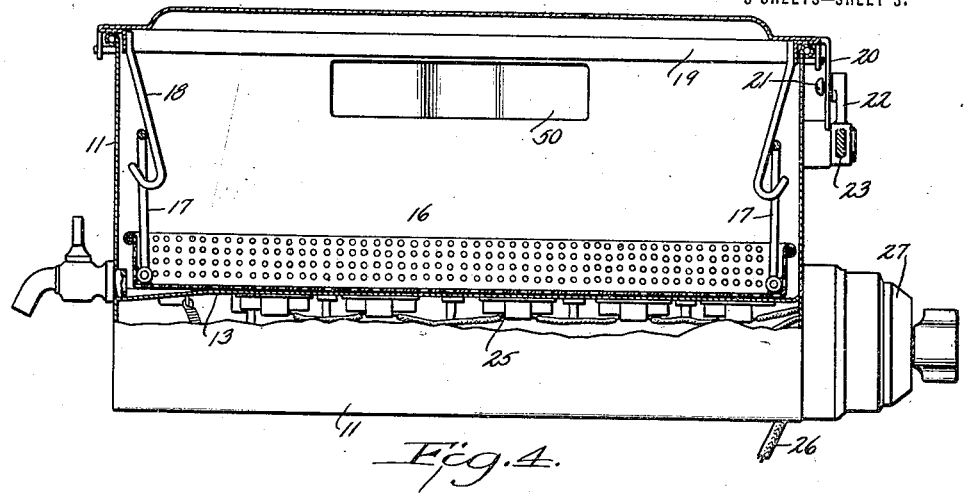
Figure 4 is a front elevation partly in section of the sterilizing vessel for sterilizing the instruments.

On a suitably constructed stand 10 is mounted a front lower vessel 11 and a rear upper vessel 12, of which the front lower vessel 11 is for sterilizing surgical, dental and other instruments while the rear upper vessel is intended for sterilizing dressings. The front lower vessel 11 is provided with a horizontal partition 13 dividing the vessel 11 into an upper or sterilizing compartment 14 and a lower or heating compartment 15. The sterilizing compartment 14 is adapted to be partly filled with water and contains a tray 16 having a perforate bottom and perforate walls, and this tray 16 is adapted to contain the instruments to be sterilized. The tray 16 is provided with pivoted bails 17 engaged by hooks 18 attached to the hinged cover 19 of the chamber 11 and adapted to be swung upward and rearward to cause the hooks 18 to lift the bails 17 and consequently the tray 16 with a view to raise the tray 16 out of the water contained in the vessel 11. It is understood that when the cover 19 is closed, the tray 16 rests on the partition 13 and the instruments contained in the tray 16 are immersed in the water contained in the vessel 11. The cover 19 is provided at one side adjacent its hinge with a cam 20 engaged by a pin 21 held on the arm 22 of a hand lever 23 fulcrumed at 24 on the corresponding end of the vessel 11. When the hand lever 23 is in the position shown in Figure 1 then the cover 19 is closed, and when the hand lever 23 is swung downward the pin 21 engaging the cam 20 imparts an upward and rearward swinging movement to the cover 19 to move the latter into open position, and in doing so, the hooks 18 lift the tray 16 out of the water contained in the vessel 11. When the hand lever 23 is swung upward back to its normal position then the cover 19 swings downward and forward into closed position.

The heating compartment 15 is adapted to be heated preferably by an electric heater 25 of any approved construction and provided with a conductor cable 26 terminating in a plug 27 for connection with a suitable source of electrical energy to supply the heater 25 with electricity. A switch 28 under the control of the user is connected with the heater 25 to turn on or cut off the electrical energy. The electrical heater 25 is also provided with an electrical switch 30 of any approved construction adapted to automatically cut off the electrical energy from the heater 25 whenever the heat exceeds a predetermined temperature.

The rear upper vessel 12 is provided with a sterilizing compartment 40 spaced from the vessel 12 to form a heating chamber 41 surrounding the bottom, the front, back, and the end walls, and the said sterilizing compartment 40 is adapted to be opened and closed by a suitable hinged cover 42 provided with a valved outlet 43 for the escape of steam, as hereinafter more fully explained. The cover 42 is provided with a suitable handle 44 for swinging the cover into open or closed position.

Figure 5:
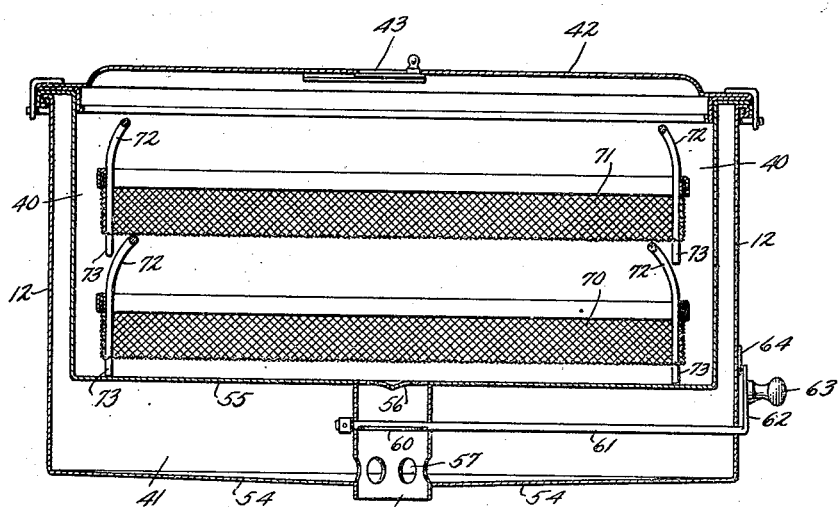
Figure 5 is a sectional front view of the vessel for sterilizing the dressings.

The upper portion of the back of the vessel 11 is provided with a rearwardly extending tube 50 terminating in an upward extension 51 in which is seated a nipple 52 forming the lower end of a tube 53 attached to the bottom 54 of the rear upper vessel 12. The upper end of the tube 53 is attached to the bottom 55 of the sterilizing compartment 40 and the portion of the bottom 55 encompassed by the tube 53 is provided with perforations 56 to connect the interior of the sterilizing compartment 40 with the upper end of the tube 53. The tube 53 is provided with apertures 57 opening into the chamber 41 adjacent the bottom 54, which latter is inclined to drain through the openings 57 into the tube 50 to allow water of condensation to return from the chamber 41 into the sterilizing compartment 14. In the tube 53 above the openings 57 is arranged a valve 60 having a valve stem 61 extending sidewise through the right-hand side of the vessel 12, and on the outer end of the stem 61 is secured an arm or a pointer 62 provided with a handle 63 for turning the stem 61 with a view to move the valve 60 into open or closed position. When the valve 60 is in closed position as shown in Figures 2 and 5 then the arm or pointer 62 indicates on a plate 64 and when the valve 60 is moved into open position then the arm or pointer 62 indicates on a plate 65, the said plates 64 and 65 being attached to the right-hand end of the vessel 12, as plainly shown in Figure 1. The plate 64 is marked "Hot air" and the plate 65 "Steam" thus indicating that when the arm or pointer is in register with the plate 64 then the valve 60 is in closed position and the air in the sterilizing compartment 40 is heated to dry the dressings therein; and when the valve 60 is in open position and the arm or pointer 62 is in register with the plate 65 then the steam arising from the water in the vessel 11 passes by way of the tubes 50 and 53 and the perforations 56 into the sterilizing compartment 40 to subject the dressings to the action of steam with a view to sterilize the same. It is understood that after the dressings have been subjected to the action of steam they are subsequently subjected to the action of hot air to dry the dressings after they have been steamed. The surplus steam in the sterilizing chamber 40 is allowed to escape prior to heating the dressings with hot air by temporarily opening the valve 43 in the cover 42. The compartment 40 is provided with perforate trays 70 and 71 having handles 72 and legs 73 for supporting the tray 70, of which the legs 73 of the tray 70 support the latter on the bottom 55 with the tray 71 resting with its bottom on the handles 72 of the tray 70. It is understood that either tray 70 or 71 may be used as the bottom tray and the other as the top tray.

The stand 10 is provided at its sides with guideways 80 in which slide transverse rods 81 attached to a tray 82 adapted to support the instruments to be sterilized or after the instruments are sterilized.

From the foregoing it will be seen that by the arrangement described, the vessels 11 and 12 are arranged in step form to permit of readily opening and closing either of the vessels for placing the instruments into the vessel 11 or for placing dressings into the vessel 12.

It will further be noticed that when the electric heater 25 is in use, the water in the sterilizing vessel 11 is heated and vapor is generated which passes by way of the tubes 50 and 53 and the open valve 60 and perforations 56 into the compartment 40 to act on the dressings contained in the trays 70 and 71 with a view to sterilize the same and while the instruments are sterilized or being subjected to the heated water in the compartment 11. After the dressings have been sterilized, the valve 60 is closed and steam is allowed to escape through the temporarily open valve 43 from the compartment 40. The air within the compartment 40 is now heated from the steam in the chamber 41 to dry the dressings, which can then be removed on opening the cover 42. The instruments after being sterilized are moved from the tray 16 after the cover 19 has been swung open and the tray raised as previously explained.

Having thus described my invention, I claim as new and desire to secure by Letters Patent:—

1. A sterilizer, comprising a stand, a sterilizing vessel supported upon the stand and provided with a removable support for the instruments to be sterilized and with a heater for the same, a second vessel supported upon the stand in a higher plane than the first vessel, a sterilizing chamber suspended in the second vessel and provided with a support for dressings, a tube leading from the upper part of the first vessel into the bottom of the second vessel, a second tube establishing communication between the first tube and the bottom of the said chamber, said second tube being provided with perforations opening into the second vessel, and a valve in said second tube.

2. A sterilizing apparatus, comprising a support, a vapor generator mounted on the support and provided with a tube leading from its upper end, a vessel mounted on the support in a higher plane than the generator and to the bottom of which the tube of the generator is connected, a sterilizing chamber suspended in the vessel, a tube establishing communication between the tube of the generator and the bottom of the sterilizing chamber, said second tube being provided with perforations at its lower end opening into the vessel, and a valve in said tube.

3. In a sterilizer, a vessel adapted to contain a liquid, a tray in the vessel, means for heating the liquid to generate steam, a second vessel, a compartment in the last named vessel, removable perforated trays in the compartment, and means for admitting the steam from the first vessel into both the second vessel and its compartment or into the vessel alone.

OTTO BARTA.